United States Patent
Beardsley

(10) Patent No.: US 9,255,547 B2
(45) Date of Patent: Feb. 9, 2016

(54) TURBINE ENGINE WITH ACCESS DOOR TO ENGINE CORE

(75) Inventor: Peter Beardsley, Derby (GB)

(73) Assignee: ROLLS-ROYCE PLC, London (GB)

( * ) Notice: Subject to any disclaimer, the term of this patent is extended or adjusted under 35 U.S.C. 154(b) by 816 days.

(21) Appl. No.: 13/536,038

(22) Filed: Jun. 28, 2012

(65) Prior Publication Data

US 2013/0047580 A1  Feb. 28, 2013

(30) Foreign Application Priority Data

Aug. 25, 2011  (GB) .................................. 1114669.3

(51) Int. Cl.
  *F02K 1/72*   (2006.01)
  *B64D 29/06*  (2006.01)
  *B64D 33/04*  (2006.01)

(52) U.S. Cl.
  CPC . *F02K 1/72* (2013.01); *B64D 29/06* (2013.01); *B64D 33/04* (2013.01); *F05D 2220/323* (2013.01); *F05D 2230/72* (2013.01); *F05D 2260/02* (2013.01)

(58) Field of Classification Search
  CPC .......... B64D 29/06; B64D 33/04; F02K 1/72; F05D 2220/323; F05D 2230/72; F05D 2260/02
  See application file for complete search history.

(56) References Cited

U.S. PATENT DOCUMENTS

| | | | |
|---|---|---|---|
| 3,541,794 A * | 11/1970 | Bollenbacher | B64D 29/08 239/265.29 |
| 3,829,020 A * | 8/1974 | Stearns | 239/265.13 |
| 4,073,440 A | 2/1978 | Hapke | |
| 2006/0145001 A1 | 7/2006 | Smith | |
| 2010/0107599 A1 | 5/2010 | Vauchel | |
| 2011/0167786 A1 | 7/2011 | Marques et al. | |
| 2011/0167790 A1 | 7/2011 | Cloft et al. | |
| 2013/0052005 A1* | 2/2013 | Cloft | 415/213.1 |

FOREIGN PATENT DOCUMENTS

FR  2 914 700 A1  10/2008
WO  WO 2011/095747 A1  8/2011

OTHER PUBLICATIONS

European Search Report issued in European Application No. 12 17 4096 dated Aug. 24, 2012.
British Search Report issued in corresponding British Application No. 1114669.3 dated Nov. 28, 2011.

* cited by examiner

*Primary Examiner* — Phutthiwat Wongwian
*Assistant Examiner* — Carlos A Rivera
(74) *Attorney, Agent, or Firm* — Oliff PLC

(57) ABSTRACT

A turbine engine includes an engine core bounded by a bypass duct, a first portion of the bypass duct defined by a fan casing having a radially inner wall and a radially outer wall, a second portion of the bypass duct defined by a radially inner wall and a radially outer wall, a third portion of the bypass duct provided as at least one access door comprising a flow guide structure; and a thrust reverser mechanism coupled to the fan casing.

14 Claims, 4 Drawing Sheets

TURBINE ENGINE WITH ACCESS DOOR TO ENGINE CORE

The present disclosure relates to a turbine engine.

In particular the disclosure is concerned with a turbine engine having an access door.

As is well known, gas turbine engines produce thrust by expelling products of combustion and, in many examples air compressed by a fan, out of the rear of the engine to produce forward thrust. As is also well known, it is common for such engines to comprise a Thrust Reverser Unit (TRU) which direct the propellant gases in a forwards direction to provide a braking force.

In some examples the thrust reverser comprises a flow turning device, for example an arrangement of vanes, sometimes referred to as a "cascade box", which turns the air being passed through them. In forward thrust applications flow turning device is covered by a cowl such that no air passes through it. In reverse thrust applications the cowl is translated downstream to expose the flow to the turning device, directing the flow forward. The TRU is typically positioned downstream of, and engaged with, a fan case of the engine.

Access to the engine core is required for inspection and maintenance reasons. Access doors are provided to facilitate this. Typically the access door comprises both the cowl and the thrust reverser unit, such that to open the access door means the thrust reverser unit mechanism is moved away from the engine core with the cowl and disengaged from the engine fan case as the door is opened.

The disadvantage of this arrangement is that the TRU structure is consequently largely independent of the engine structure and so the opportunities for distributing loads induced by reverse thrust, and the weight of the mechanism itself, are limited. Hence additional structures on either side of the interface between the engine fan case and the TRU are required. This adds weight and cost to the engine structure. Additionally, the larger the engine, the larger the access door structure must be. As door size increases, door hinges, latches and actuators (for example hydraulic pistons) to facilitate safe and reliable opening and closing also must increase in size. This adds extra weight and expense to the engine. As engines get larger the penalties associated with opening these ducts increase.

Hence an arrangement for engine core access and engine removal which is lighter that known arrangements and yet still provides for thrust reverser unit functionality is highly desirable.

SUMMARY

Accordingly there is provided a gas turbine engine comprising an engine core bounded by a bypass duct; a first portion of the bypass duct defined by a fan casing having a radially inner wall and a radially outer wall; a second portion of the bypass duct defined by a radially inner wall and a radially outer wall; a third portion of the bypass duct provided as at least one access door comprising a flow guide structure; and a thrust reverser mechanism coupled to the fan casing; the at least one access door being pivotable between an open position and a closed position relative to the thrust reverser mechanism; the flow guide structure having a first panel spaced apart from a second panel such that in a closed position the first panel forms a continuous flow surface with the second portion's radially outer wall and the second panel forms a continuous flow surface with the second portion's radially inner wall and covers a section of the engine core; and in an open position the access door provides access to the engine core.

Hence the access door is mounted separately to the thrust reverser mechanism. Thus the access door structure is lighter than conventional access doors, thus requiring smaller hinges, latches and actuation mechanisms, which results in an engine structure which is lighter, cheaper and easier to build.

BRIEF DESCRIPTION OF THE DRAWINGS

Examples of the present disclosure will now be described with reference to the accompanying drawings, in which.

DETAILED DESCRIPTION

Figure 1:
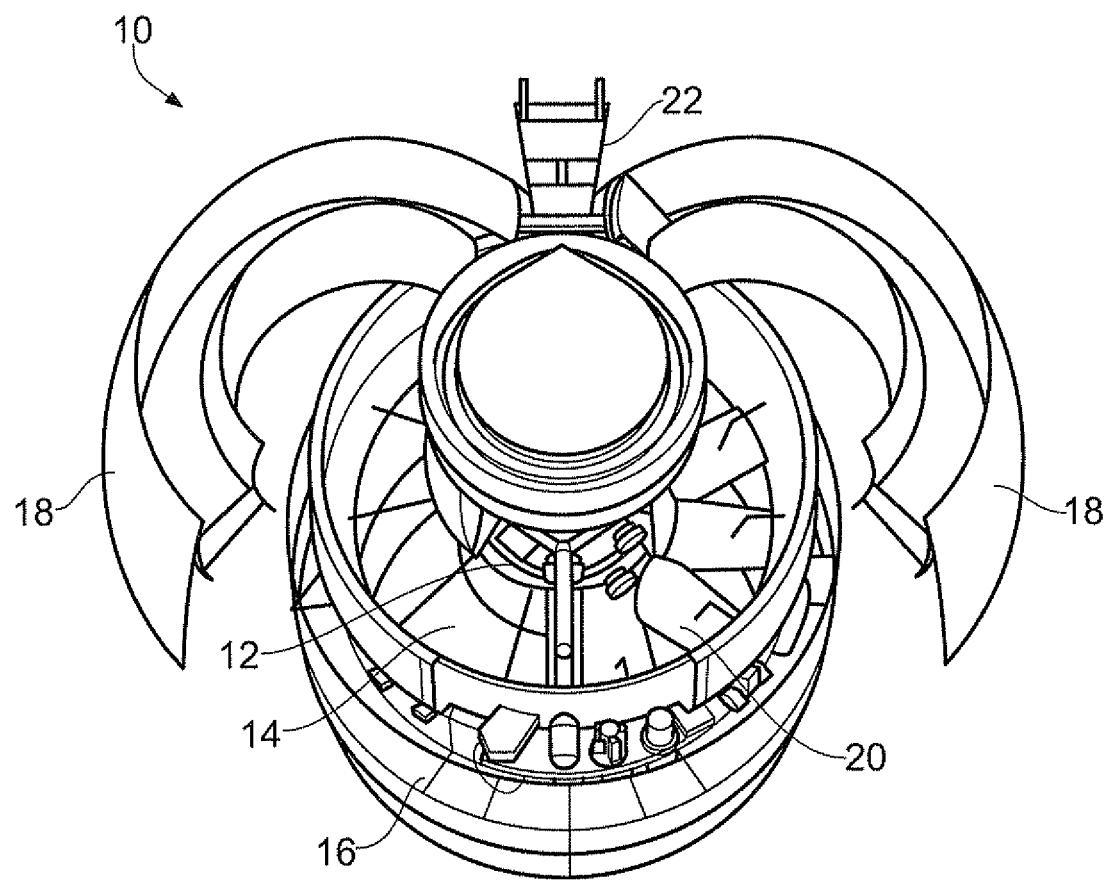
FIG. 1 shows a rear end view, looking upstream, of a gas turbine engine with access doors and bypass inner walls open to permit access to the core of the engine.

FIG. 1 shows a rear view of a gas turbine engine 10, looking in an upstream direction. The engine 10 comprises engine core 12 bounded by a bypass duct 14 which is defined, in part, by a fan casing 16. Arcuate access doors 18 are shown in an open position, permitting access to the engine core 12. In the right hand side of the picture, radially inner walls 20, as described below, are shown in an open position to enable access to the engine core 12. The radially inner walls 20 may also be referred to as "core fairings". An engine mount 22 is provided, in this example, at a top dead centre position for attaching the engine 10 to an aircraft structure, for example, a wing (not shown). In this example the access doors 18 are pivotably mounted from the engine mount 22.

Figure 2:
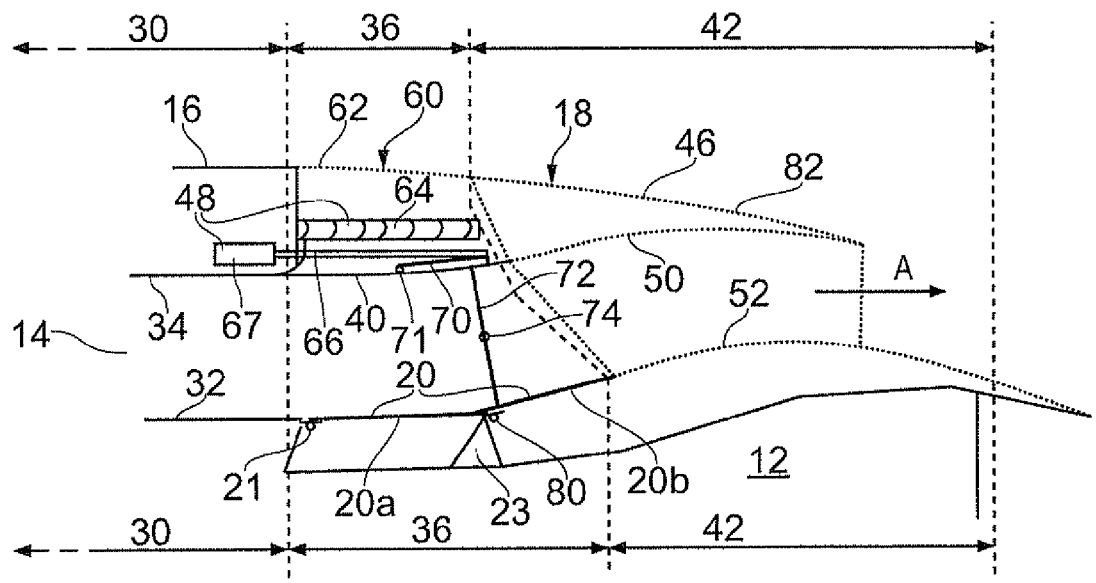
FIG. 2 is a sectional view through a region of the engine showing the downstream end of the bypass duct and thrust reverser unit in a stowed position.

FIG. 2 shows a sectional view through a region of the engine 10 at the downstream end of the bypass duct 14. In this region the bypass duct 14 comprises a first portion 30 defined by a fan casing radially inner wall 32 and a fan casing radially outer wall 34; a second portion 36 defined by a radially inner wall (or "core fairing") 20 and a radially outer wall 40; a third portion 42 provided as at least one access door 18 comprising a flow guide structure 46. The first portion 30 of the bypass duct 14 is upstream of the second portion 36 of the bypass duct 14, and the second portion 36 of the bypass duct 14 is upstream of the third portion 42 of the bypass duct 14. The access door 18 and flow guide structure 46 is shown as a dotted line. The flow guide structure 46 may also be referred to as a translating cowl (or "transcowl") since it is moveable in an axial direction. This functionality is described in more detail below.

In this example, as shown in FIG. 1, two access doors 18 are provided. In other examples there may be one access door, or three or more. In this example the access doors 18 bound the complete circumference of the engine core 12.

A thrust reverser mechanism 48 is coupled to the fan casing 16,34 and in this example spans the first portion 30 and second portion 36. The thrust reverser mechanism 48 is provided upstream of the flow guide structure 46. The access doors 18 are pivotable between an open position and a closed position relative to the thrust reverser mechanism 48. The access doors 18 are mounted separately to the thrust reverser mechanism 48 such that the access doors 18 are free to move independently of the thrust reverser mechanism 48.

The flow guide structure 46 has a first panel 50 spaced apart from a second panel 52 such that in a closed position the first panel 50 forms a continuous flow surface with the second portion's radially outer wall 40 and the second panel 52 forms a continuous flow surface with the second portion's radially inner wall 20. The second panel 52 also covers a section of the engine core 12 when in a closed position. Thus when the access door 18 is in an open position, and consequentially the second portion's radially inner wall 20 is in an open position, access is provided to the engine core 12. The radially outer wall 40 of the second portion 36 is a separate component to the access door 18, and remains in place around the engine core 12 when the access door 18 is opened. The radially outer wall 40 and first panel 50 are coupled by any appropriate conventional means, and may be latched together to ensure they remain coupled during operation of the engine. Any engaged latched mechanism holding them together is disengaged prior to the opening of the access door 18 to allow the first panel 50 to move relative to the radially inner wall 40.

A section 60 defined by an outer wall 62 of the access door 18 extends upstream from the flow guide structure 46 such that, in a closed position, it bounds at least part of the thrust reverser mechanism 48. Thus the section 60 is radially outward of and bounds the second portion 32 of the bypass duct 14. When the access door 18 is in an open position it provides access to at least part of the thrust reverser 48.

The outer wall section 60,62 is continuous an outer wall 82 of the flow guide structure 46 such that there are no steps and/or gaps on the external surface of the flow guide structure 46.

The thrust reverser mechanism 48 comprises a flow turning device 64 mounted to the fan casing 16. The access door outer wall 62 bounds the flow turning device 64 when in a closed position and provides access to the flow turning device 64 when in an open position. The thrust reverser mechanism 48 further comprises an actuation rod 66 coupled at one end to an actuator 67 and its other end to radially inner wall 40 of the second portion 36 of the bypass duct 14. In this example the thrust reverser mechanism 48 also has a blocker door 70 pivotably mounted at one end at an attachment point 71 from the second portion of the bypass duct's radially outer wall 40, the other end of the blocker door 70 being coupled to the first portion's radially inner wall 32 or second portion's radially inner wall 20 via a link member 72. The link member 72 is hinged at a point 74 along its length. The access door outer wall 62 bounds the actuation rod 66, blocker door 70 and link member 72 when in a closed position and provides access to these components when in an open position.

The second portion's radially inner wall 20 is pivotably coupled to the fan casing 16 such that in a closed position the second portion's radially inner wall 20 forms a continuous flow surface with the fan casing radially inner wall 32 and in an open position provides access to the engine core 12.

The split on the inner surface of the flow guide structure 46 between the opening and non opening surfaces is positioned at the downstream edge of the blocker door 70. Thus only a single split is required to accommodate the blocker door 70 and the join between the opening and non opening surfaces. This is advantageous since it is beneficial to keep the number of discontinuities (i.e. steps and/or gaps) in flow surfaces minimal in order to minimise performance penalty through aerodynamic losses.

The second portion's radially inner wall 20 comprises a first section 20a located upstream of a second section 20b, the first section 20a and second section 20b being connected by a hinge 80. The first section 20a is coupled to the fan casing 16,32 at its upstream edge by a hinge 21. In a closed position, as shown in FIG. 2 and FIG. 3, the radially inner wall 20 is supported off the engine core 12 by a support member 23 and makes a sealed joint with the second panel 52 of the flow guide structure 46.

The arrangement shown in FIG. 2 is annular. That is to say, all the features described are present around the circumference of the engine. While some features are essentially continuous (for example the access doors 18 and fan casing 16), other features are one of a number duplicated around the circumference (for example the second portions radially inner walls 20 ["core fairings"], blocker doors 70, link members 72, flow turning device 64, actuation rods 66). Having a number of core fairings 20 around the circumference has the advantage that if only limited access is needed to the engine core 12 (for example to gain access to a particular engine port or component) then only the core fairing 20 in that region need be opened.

FIG. 2 shows a configuration in which the thrust reverser mechanism 48 is stowed for forward thrust operation, where all of the propellant gas from the engine is exhausted in a downstream direction as indicated by arrow "A" in FIG. 2. During operation of the engine the access door 18 is closed.

Figure 3:
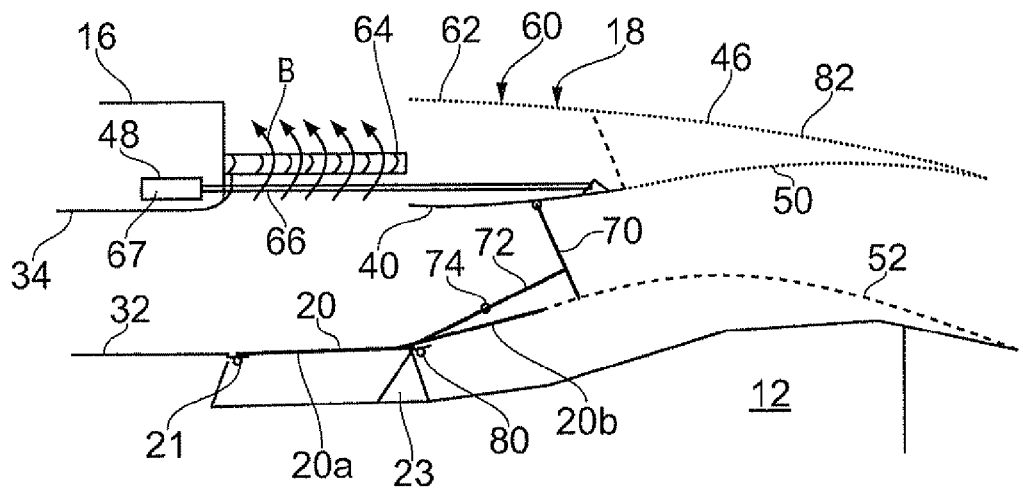
FIG. 3 shows a view of the same region of the engine as FIG. 2 only with the thrust reverser unit deployed.

FIG. 3 shows a configuration in which the thrust reverser mechanism 48 is deployed in a thrust reversal mode, where the majority of the propellant gas from the engine is directed radially outwards and/or to some extent in an upstream direction as indicated by arrows B. In this mode of operation the access door 18 is closed. As in FIG. 2 the access door 18 is shown by a dotted line for clarity.

In order to move from the stowed position to the deployed position, the actuator 67 moves the actuation rod 66 which acts on the radially inner wall 40, which in turn acts on the flow guide structure 46. The radially inner wall 40 and flow guide structure 46 are thus displaced relative to the fan casing 16 in an axial direction and the radially outer wall 40 of the second portion is translated axially downstream relative to the fan casing radially outer wall 34 and the flow turning device 64, thus exposing the flow turning device 64 to gases flowing through the bypass duct 14. Also as the flow guide structure 46 moves axially downstream, the blocker door 70 is moved downstream also. Since the link member 72 attached to the blocker door 70 is fixed to one of the radially inner walls 32,20, the link member 72 acts on the blacker door to cause it to pivot about its attachment point 71. This downstream motion draws the blocker door 70 across the bypass duct 14 to cause a blockage, as shown in FIG. 3. The deployment of the blocker door 70 ensures that most of the air passing along the bypass duct 14 is directed through the flow turning device 64, thus creating reverse thrust.

When reverse thrust is no longer required, the actuator 48 draws in the actuation rod 66, which acts to reverse the deployment movement described above to return the thrust reverser to a stowed position as shown in FIG. 2.

Since the actuation rod 66 acts on the radially inner wall 40, which in turn acts on the flow guide structure 46, this means that the access door 18 comprising the flow guide structure 46 can be opened and pivot relative to the actuation mechanism 48 once the radially inner wall 40 and first panel have been decoupled.

Figure 4:
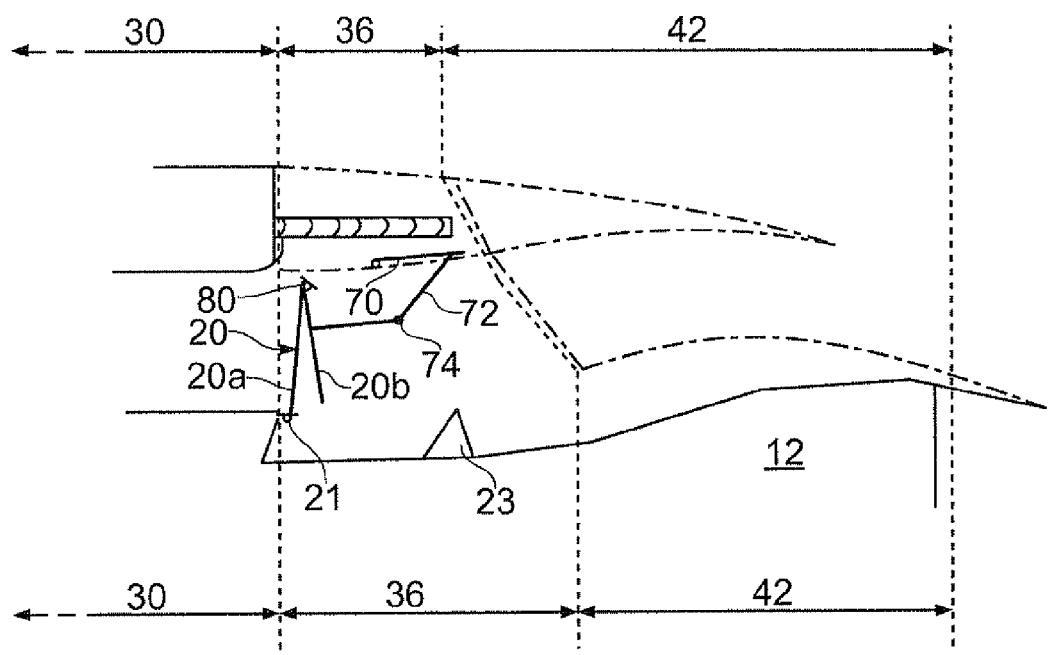
FIG. 4 shows a view of the same region of the engine as FIG. 4 with the bypass inner walls being shown in an open position.

FIG. 4 shows a configuration in which the engine is non operational and the access doors 18 have been opened to provide access to a portion of the engine core 12 which is bounded by the third portion 42 of the bypass duct 14. For reference, the closed position of the access door 18 in this configuration is shown as a dotted line. Also for clarity, the actuation mechanism 48 is not show in this figure, although for reference it would be arranged as shown in FIG. 1. The radially inner wall 20 (or "core fairing") is folded back on itself about its hinge 80 to provide access to a portion of the engine core 12 which is bounded by the second portion 36 of the bypass duct 14. The first section 20a is hinged radially outwards while the second section 20b hinges inwards. The link member 72 is lifted clear of the engine core 12 since it is connected to the radially inner wall 20. The link member hinge 74 permits the sections of the radially inner wall 20 to move through the necessary path whilst still being attached to the link member 72. A spring loaded mechanism may be provided at the link member hinge 74 to lock the link member 72 into a fixed position to assist in holding the core fairings 20 open.

Figure 5:
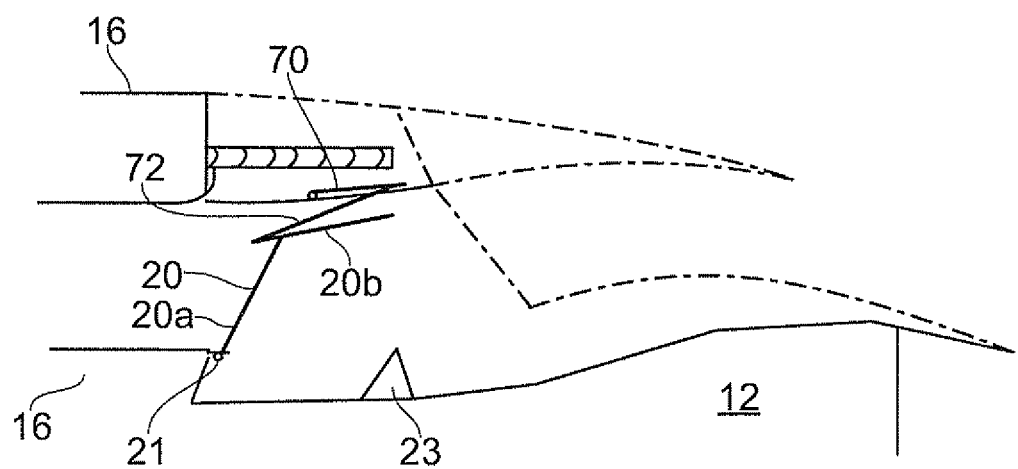
FIG. 5 shows an alternative example to that shown in FIG. 4, with the bypass inner walls being shown in an open position.

FIG. 5 shows an alternative configuration to that shown in FIG. 4 providing access to the same portions of the engine core 12. As with the arrangement in FIG. 4, this example has a first section 20a and second section 20b of a radially inner wall 20 which are fixed to the support member 23 when the access doors 18 are in a closed position. However, in this arrangement the first and second sections 20a,20b are not hinged together. During the opening process, the first section 20a and second section 20b are disengaged from the support member 23, and then the second section 20b is pivoted forward (i.e. upstream) with the link member 72. The first section 20a pivots about its hinge 21 and is locked in a position whereby the second section 20 is trapped in an open position, for example as shown in FIG. 5. In an example where the first section 20a and second section 20b are fixed to one another when the access doors 18 are in a closed position, the second section 20b is disconnected from the first section 20a to allow them to pivot to an open position.

Since the access doors 18 comprise little more than the flow guide structure 46, with the features of the thrust reverser mechanism (i.e. flow turning device 66, actuation mechanism 48, blocker door 70 and link member 72) and core fairings 20 being coupled directly to the engine fan casing 16, the structure of the access doors 18 is relatively simple and lightweight compared to conventional access doors which comprise the thrust reverser mechanism. Thus access door hinges, actuation and locking features may also be smaller and lighter than for conventional arrangements.

Also having the thrust reverser mechanism coupled directly to the engine fan case 16 provides the advantage that during operation of the thrust reverser, loads are communicated directly onto the fan case and engine structure.

The examples herein described also provide the advantage than relatively few components need to be moved or opened to gain access to the engine core 12.

The invention claimed is:
1. A turbine engine comprising:
an engine core bounded by a bypass duct;
a first portion of the bypass duct defined by a fan casing having a first radially inner wall and a first radially outer wall;
a second portion of the bypass duct defined by a second radially inner wall and a second radially outer wall;
a third portion of the bypass duct provided as at least one access door comprising a flow guide structure; and
a thrust reverser mechanism coupled to the fan casing, wherein the at least one access door is pivotable between an open position and a closed position relative to the thrust reverser mechanism;
the second radially outer wall is a separate component to the access door and remains in place around the engine core when the access door is opened;
the flow guide structure has a first panel spaced apart from a second panel such that in the closed position the first panel forms a continuous flow surface with the second radially outer wall and the second panel forms a continuous flow surface with the second radially inner wall and covers a section of the engine core;
in the open position, the access door provides access to the engine core; and
when the access door is in the open position and the second radially inner wall is open, the second radially inner wall provides access to the engine core.

2. The turbine engine as claimed in claim 1, wherein the thrust reverser mechanism is provided upstream of the flow guide structure.

3. The turbine engine as claimed in claim 2, wherein, in the closed position, a section of an outer wall of the access door extends upstream from the flow guide structure and bounds at least part of the thrust reverser mechanism, such that when the access door is in the open position the access door provides access to the at least part of the thrust reverser mechanism.

4. The turbine engine as claimed in claim 3, wherein the thrust reverser mechanism comprises a flow turning device, and the access door outer wall bounds the flow turning device when in the closed position and provides access to the flow turning device when in the open position.

5. The turbine engine as claimed in claim 3, wherein the thrust reverser mechanism comprises an actuation rod for displacement of the third portion relative to the first portion, and the access door outer wall bounds the actuation rod when in the closed position and provides access to the actuation rod when in the open position.

6. The turbine engine as claimed in claim 1, wherein the access door is arcuate.

7. The turbine engine as claimed in claim 1, wherein the at least one access door comprises at least two access doors, each of the at least two access doors being arcuate and pivotably mounted.

8. The turbine engine as claimed in claim 7, wherein the at least two access doors bound a complete circumference of the engine core.

9. The turbine engine as claimed in claim 1, wherein the thrust reverser mechanism has a blocker door with a first end pivotably mounted to the second radially outer wall and a second end coupled to the first radially inner wall or the second radially inner wall via a link member.

10. The turbine engine as claimed in claim 1, wherein the second radially inner wall is pivotably coupled to the fan casing such that when the second radially inner wall is closed the second radially inner wall forms a continuous flow surface with the first radially inner wall and when open provides access to the engine core.

11. The turbine engine as claimed in claim 1, wherein the second radially inner wall comprises a first section located upstream of a second section, the first section and the second section being connected by a hinge.

12. The turbine engine as claimed in claim 9, wherein the link member is hinged at a point along a length of the link member.

13. The turbine engine as claimed in claim 1, wherein the first portion of the bypass duct is upstream of the second portion of the bypass duct, and the second portion of the bypass duct is upstream of the third portion of the bypass duct.

14. The turbine engine as claimed in claim 1, further comprising a plurality of blocker doors.

* * * * *